Dec. 29, 1970          D. J. ROTIER          3,551,824
CONTROL APPARATUS

Filed Aug. 1, 1967                    9 Sheets-Sheet 8

A INCLUDING SAMPLE ———
B INCLUDING SAMPLE — — —
C INCLUDING SAMPLE — · — · —
D INCLUDING SAMPLE · · · · · ·
OUTPUT (SELECTED SIGNAL) / / / / / / /

INVENTOR.
DONALD J. ROTIER
BY Bruce C. Lutz
ATTORNEY

Dec. 29, 1970   D. J. ROTIER   3,551,824
CONTROL APPARATUS
Filed Aug. 1, 1967   9 Sheets-Sheet 9

INVENTOR.
DONALD J. ROTIER
BY Bruce C Lutz
ATTORNEY

United States Patent Office 3,551,824
Patented Dec. 29, 1970

3,551,824
CONTROL APPARATUS
Donald J. Rotier, St. Paul, Minn., assignor to Honeywell Inc., Minneapolis, Minn., a corporation of Delaware
Filed Aug. 1, 1967, Ser. No. 657,480
Int. Cl. H04b 1/04
U.S. Cl. 328—147       11 Claims

ABSTRACT OF THE DISCLOSURE

An integrated monitor and cross-feeding circuit for providing an output of a given characteristic from similar control channels of a two, three, or four channel control system.

BACKGROUND

This invention pertains to the field of circuitry for monitoring condition control systems and more specifically to circuitry for monitoring control systems in which control information is derived from multiple sensors and the information from each sensor is processed by similar computing networks. The invention provides, to a control element, a resultant signal which is derived from the multiple signals present at the outputs of the similar computing networks. Failures in the sensors, the computing networks, or the monitor circuit are detected by the monitor circuit and prevented from being transmitted to the control element.

The prior art monitoring circuits often employ voting logic techniques to detect the failure of one of a plurality of signals. The voting logic mechanizations require a high degree of complexity, especially for control systems employing more than three channels. Since the invention described herein does not use voting logic techniques and utilizes many components to provide dual function, the circuit complexity is decreased allowing for higher inherent reliability.

The invention was developed in response to a need for a multiple channel monitor and signal cross-feeding circuit which will, in the presence of a number of failures, allow safe control system operation and positive identification of existing failures.

Multiple channel monitor and signal cross-feeding circuits of this type may be used in aircraft and spacecraft control systems, where multiple control channels are used to provide extremely high reliability.

DESCRIPTION

The invention is a signal cross-feed and monitoring technique which may also be called a sampled middle select circuit for reasons which will become apparent after a complete reading of the description of the operation of the invention.

The sampled middle select circuit is comprised of high gain amplifiers which are used to perform the dual function of signal transmission and monitoring.

A sampling signal is combined with the input signal to each high gain amplifier to continually exercise the majority of the circuitry at all times. This presents a distinct advantage over prior art circuits mechanized with an active channel and back-up channels and which depend on the assumption that the back-up channels will be functional when they are called upon to act after an initial failure in the active channel or the monitor.

It is an object of this invention to provide a unique method of monitoring and cross-feeding signals in a multiple channel control system.

It is a further object of this invention to provide a method of monitoring and cross-feeding signals which utilizes a sampling input to continuously exercise all of the channels of the monitoring circuit to eliminate the possibility of latent failures in an unexercised channel.

It is a still further object of this invention to provide for use in a multiple channel system a sample middle select circuit which will provide positive indications of system failure for either monitor or system failures.

Further objects and advantages will become apparent from a reading of the specification and claims in conjunction with the drawings wherein:

Figure 1:
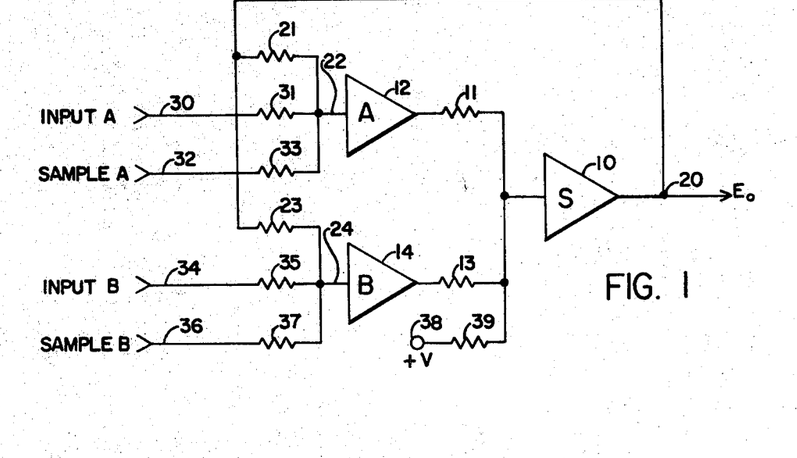
FIG. 1 is a simplified block diagram of a two channel configuration of the sampled middle select circuit.

In FIG. 1 a summing amplifier 10 receives an input through a resistor 11 from a first high gain amplifier 12 and through a resistor 13 from a second high gain amplifier 14. Feedback currents are provided from the output 20 of the summing amplifier 10 through a resistor 21 to an input 22 of amplifier 12 and through a resistor 23 to an input 24 of amplifier 14. An input signal representative of the output of a control channel A is applied at an input terminal 30 and passes through a resistor 31 to the input 22 of amplifier 12. A sampling signal "Sample A" is applied to a terminal 32 and passed through a resistor 33 to the amplifier input 22. An input signal, representative of the condition of a control channel B is connected to an input terminal 34 and passes through a resistor 35 to the input 24 of the amplifier 14. A sampling signal "Sample B" is applied to a terminal 36 and passed through a resistor 37 to the amplifier input 24.

The ratio of the change in the feedback current caused by a change in the input current is a constant at amplifier input terminals 22 and 24. The ratio of the change in the feedback current produced by a change in the sample input current is equal at amplifier input terminals 22 and 24. A source of positive voltage 38 is connected through a resistor 39 to the input of the summing amplifier 10. There is an inversion of signal amplitude between the signal applied at input terminals 22 and 24 and the output 20 of the summing amplifier 10.

Figure 2:
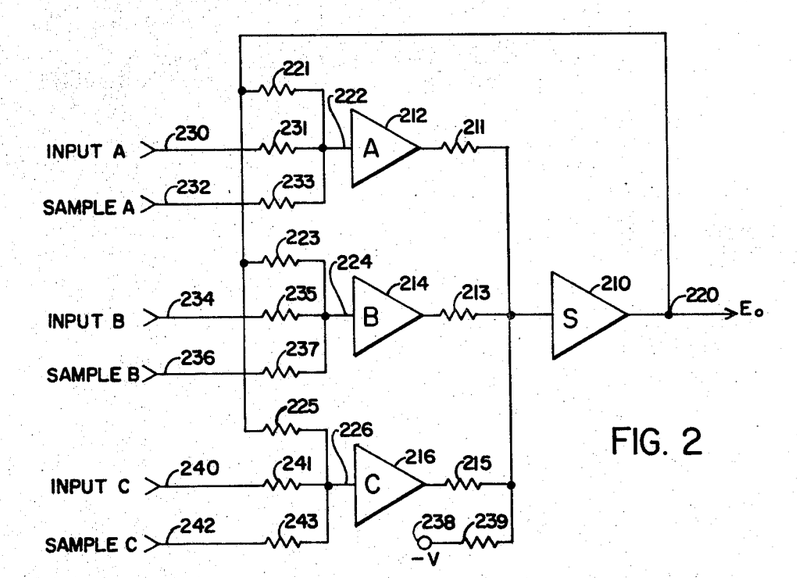
FIG. 2 is a simplified block diagram of a three channel configuration of the sampled middle select circuit.

In FIG. 2 a summing amplifier 210 is fed inputs from resistors 211, 213, 215, and 239. Resistor 211 receives an input from the output of a high gain amplifier 212, resistor 213 receives an input from the output of a high gain amplifier 214, and resistor 215 receives an input from the output of a high gain amplifier 216. Resistor 239 is connected at the other end to a negative D.C. voltage source 238.

A feedback path is provided from an output terminal 220 of amplifier 210 through a resistor 221 to an input 222 of the high gain amplifier 212, through a resistor 223 to an input 224 of the high gain amplifier 214, and through a resistor 225 to an input 226 of the high gain amplifier 216. Further inputs are provided to the input 222 of amplifier 212 from an "Input A" terminal 230 through a resistor 231 and from a "Sample A" terminal 232 through a resistor 233. The input 224 of amplifier 214 receives additional inputs from an "Input B" terminal 234 through a resistor 235 and from a "Sample B" terminal 236 through a resistor 237. The input 226 of amplifier 216 receives additional inputs from an "Input C" terminal 240 through a resistor 241 and from a "Sample C" terminal 242 through a resistor 243.

There is an inversion of signal amplitude between a signal applied at input terminals 222, 224, and 226 and the output 220 of the summing amplifier 210. The ratio of the change in the feedback current caused by a change in the signal input current is a constant for amplifier input terminals 222, 224, and 226. The ratio of the change in the feedback current caused by a change in the sample input current is a constant for amplifier input terminals 222, 224, and 226.

Figure 3:
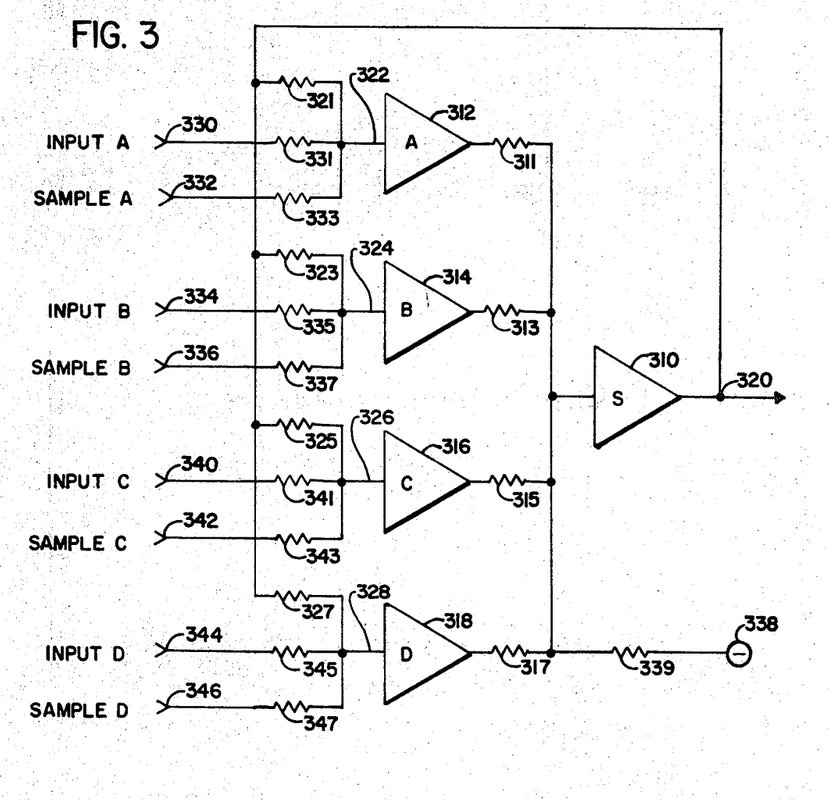
FIG. 3 is a simplified block diagram of a four channel configuration of the sampled middle select circuit.

In FIG. 3 a summing amplifier 310 receives inputs from resistors 311, 313, 315 and 317 each of which may have the same magnitude. A further input is supplied by resistor 339. The input to resistor 311 is from a high gain amplifier 312, the input to resistor 313 is from a high gain amplifier 314, the input to resistor 315 is from a high gain amplifier 316, the input to resistor 317 is from a high gain amplifier 318 and the input to resistor 339 is from a negative D.C. voltage source 338. The output 320 of the summing amplifier 310 is connected to provide feedback through a resistor 321 to an input 322 of the high gain amplifier 312, through a resistor 323 to an input 324 of the high gain amplifier 314, through a resistor 325 to an input 326 of the high gain amplifier 316 and through a resistor 327 to an input 328 of the high gain amplifier 318. Amplifier 312 receives additional inputs from an "Input A" terminal 330 through resistor 331 and a "Sample A" terminal 332 through a resistor 333. Amplifier 14 receives additional inputs at input terminals 324 from an "Input B" terminal 334 through a resistor 335 and a "Sample B" terminal 336 through a resistor 337. Amplifier 316 receives additional inputs at the input terminal 326 from an "Input C" terminal 340 through a resistor 341 and a "Sample C" terminal 342 through resistor 343. Amplifier 318 receives additional inputs at input terminal 328 from "Input D" terminal 344 through resistor 345 and "Sample D" terminal 346 through resistor 347.

There is an inversion of signal amplitude between the signal applied at input terminals 322, 324, 326, and 328 and the summing amplifier output 320. The ratio of the change in the feedback current caused by a change in the input current is a constant at amplifier input terminals 322, 324, 326, and 328. The ratio of the change in the feedback current caused by a change in the sample input current is a constant for amplifier input terminals 322, 324, 326, and 328. The magnitude of each of the signal input resistors 331, 335, 341, and 345 may also be equal. The sampling input resistors 333, 337, 343, and 347 may each have a magnitude equal of the signal input resistors.

Figure 4:
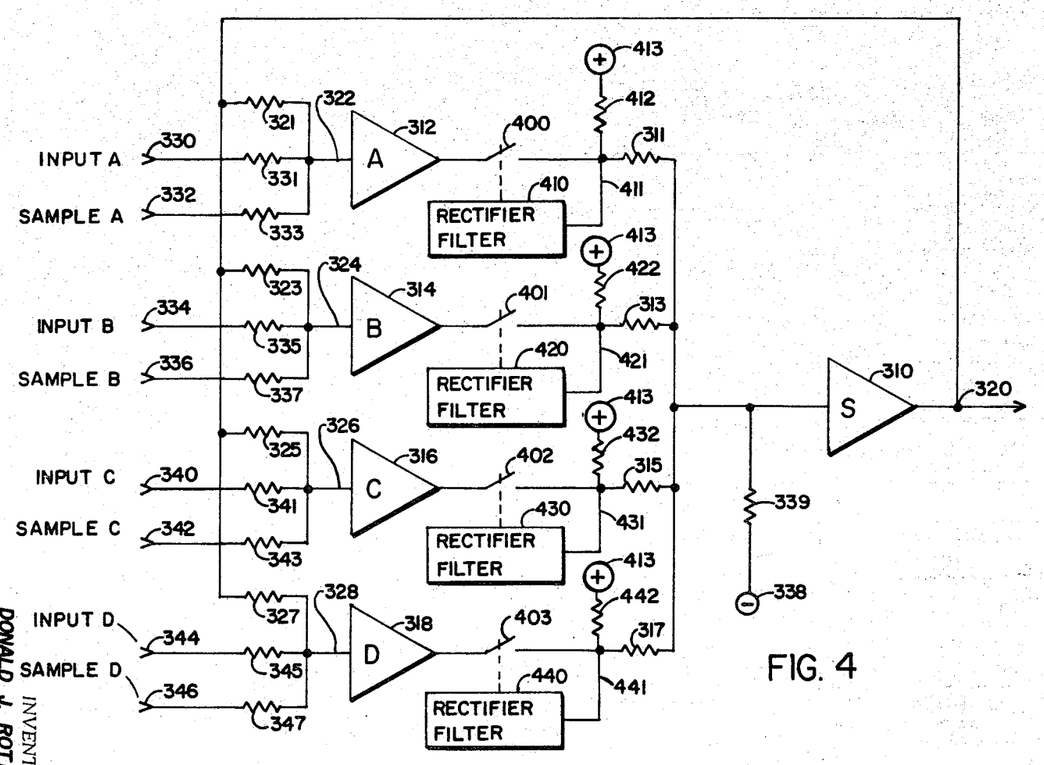
FIG. 4 is a block diagram of the four channel sampled middle select circuit of FIG. 3 illustrating the use of individual channel monitors and channel disengage switches.

In FIG. 4 the circuit of FIG. 3 has been modified by the addition of components. All of the original components still have the same designation numbers however. A series switch 400 is inserted in series with the output of amplifier 312. A series switch 401 is inserted in series with the output of amplifier 314, a series switch 402 is inserted in series with the output of amplifier 316, and a series switch 403 is inserted in series with the output of the amplifier 318. The first series switch 400 is controlled by a rectifier and filter circuit 410 which receives an input through a conductor 411 which is connected to the output of the amplifier 312 through switch 400 which is shown in the open condition. Conductor 411 is also connected through a bias resistor 412 to a source of positive supply voltage 413. Series switch 401 is controlled by a rectifier and filter circuit 420 which receives an input through a conductor 421 which is connected to the output of amplifier 314 through the switch 401 which is shown in the open configuration. Conductor 421 is also connected through a bias resistor 422 to a source of positive supply voltage 413. Series switch 402 is controlled by a rectifier filter circuit 430 which receives an input through a conductor 431 which is connected to the output of amplifier 316 through the switch 402 which is shown in the open condition. Conductor 431 is also connected through a bias resistor 432 to a source of positive supply voltage 413. Series switch 403 is controlled by a rectifier and filter 440 which receives an input through a conductor 441 which is connected to the output of amplifier 318 through the normally closed switch 403. Conductor 441 is also connected through a bias resistor 442 to a source of positive supply voltage 413. The bias resistors 412, 422, 432, and 442 may each have the same magnitude.

Figure 5:
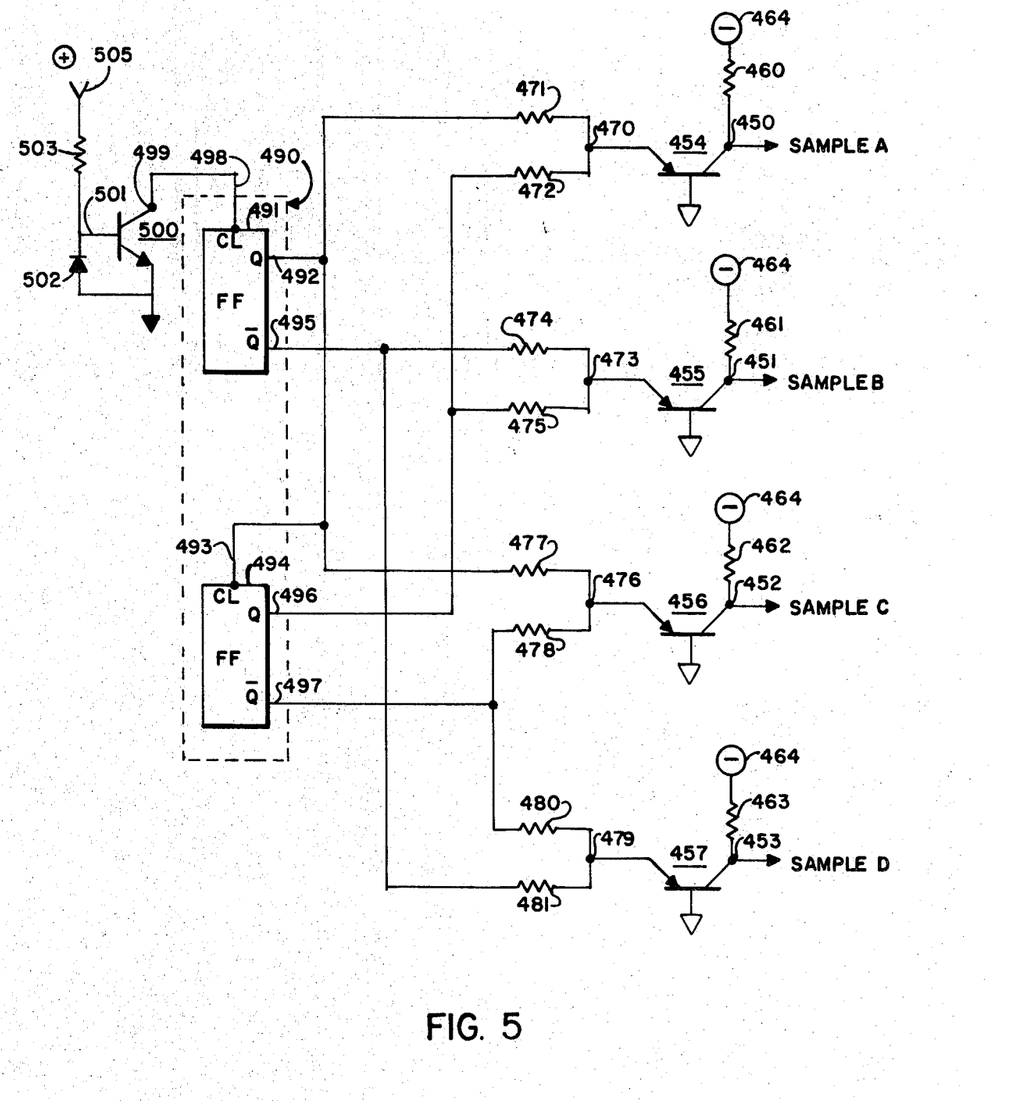
FIG. 5 is a block diagram of a sample signal generator to be used with the sampled middle select circuits.

In FIG. 5 the A, B, C, and D sampling signals are produced respectively at collectors 450, 451, 452, and 453 of common base connected PNP transistors or amplifiers 454, 455, 456, and 457. Collectors 450, 451, 452, and 453 are respectively connected through resistors 460, 461, 462, and 463 to a negative power supply 464. An emitter 470 of PNP transistor 454 is connected to input resistors 471 and 472. An emitter 473 of PNP transistor 455 is connected to input resistors 474 and 475. An emitter 476 of PNP transistor 456 is connected to input resistors 477 and 478. An emitter 479 of transistor 457 is connected to input resistors 480 and 481. The input signals to the common base amplifiers are derived from a dual flip-flop module 490 which is shown in block diagram form. A flip-flop 491 has a connection from a Q output 492 to a clock input 493 of a flip-flop 494 and also to resistors 471 and 477. A $\overline{Q}$ output 495 of flip-flop 491 is connected to resistors 474 and 481. A Q output 496 of flip-flop 494 is connected to the input resistors 472 and 475. A $\overline{Q}$ output 497 of flip-flop 494 is connected to input resistors 478 and 480. A clock input 498 of flip-flop 491 is connected to a collector 499 of a common-emitter connected NPN transistor 500. A base 501 of the NPN transistor 500 is connected to a cathode of a diode 502 which has a grounded anode. The base 501 of the transistor 500 is also connected through a resistor 503 to a positive source of alternating voltage 505.

Figure 6A:
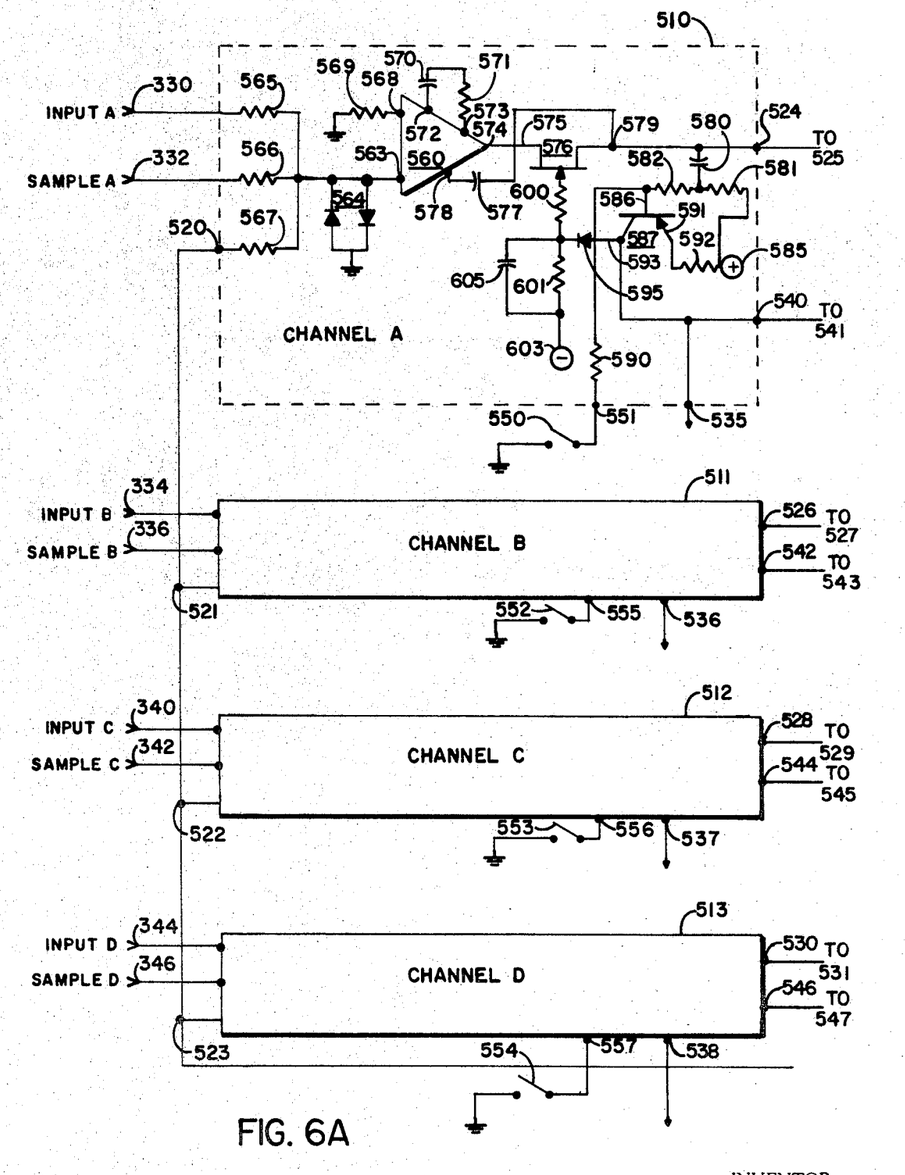
FIGS. 6A and 6B comprise a schematic diagram of a preferred embodiment of the four channel sampled middle select circuit shown in block diagram form in FIG. 4.
Figure 6B:
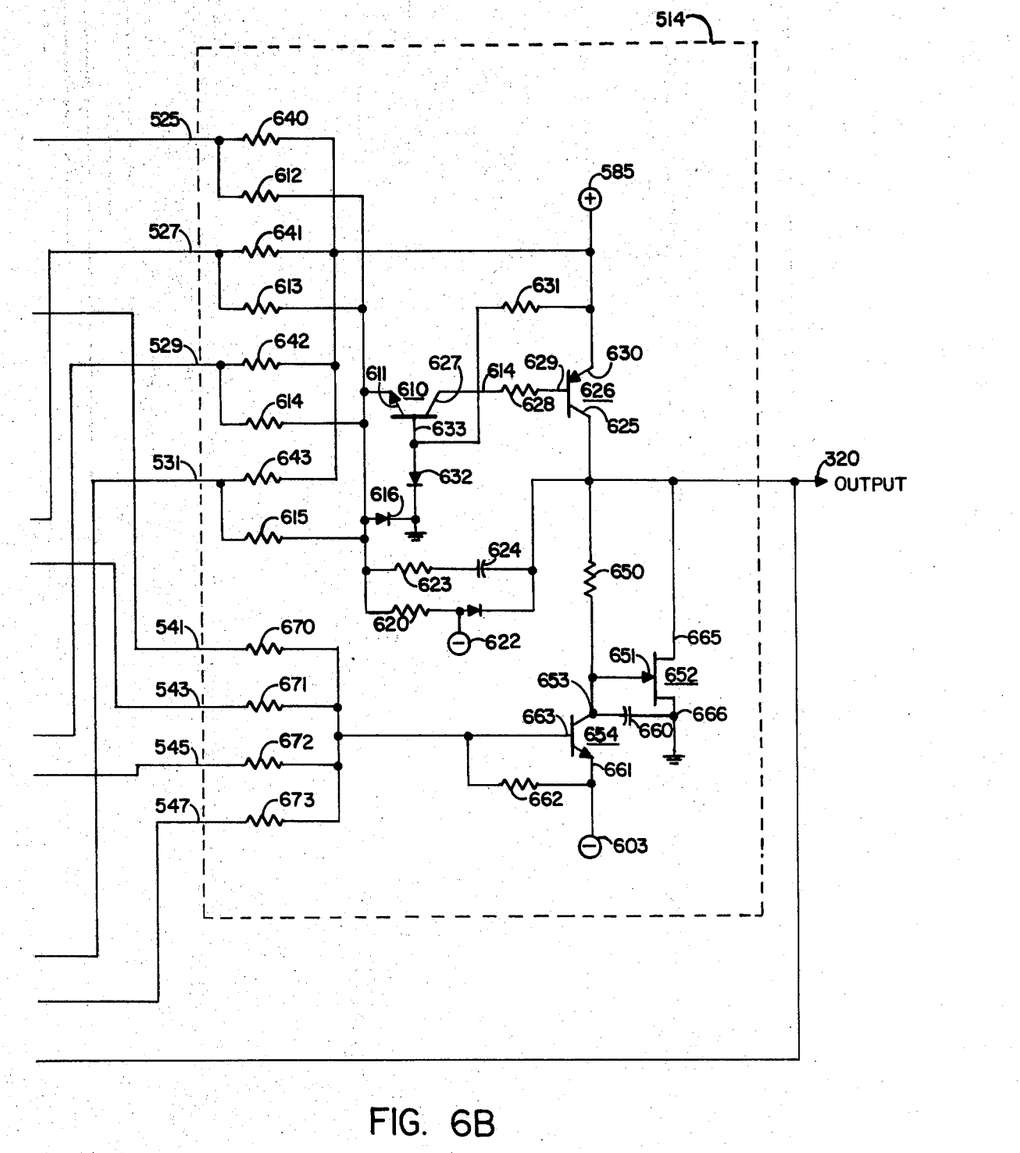

Identical amplifier and monitor modules 510, 511, 512, and 513 of FIG. 6A are connected to a summing amplifier module 514 of FIG. 6B. The output 320 of the summing amplifier module 514 is connected to feedback terminals 520, 521, 522, and 523 of amplifier and monitor modules 510, 511, 512, and 513 respectively. The signal input terminals 330, 334, 340, and 344 as well as the sample input terminals 332, 336, 342, and 346 are as shown in FIG. 4. A signal output terminal 524 of amplifier module 510 is connected to a summing amplifier input terminal 525 FIG. 6B, a signal output terminal 526 of amplifier module 511 is connected to a summing amplifier terminal 527, a signal output terminal 528 of amplifier module 512 is connected to a summing amplifier input terminal 529, and a signal output terminal 530 of amplifier module 513 is connected to a summing amplifier input terminal 531.

Two channel-failure logic indications are transmitted from each amplifier and monitor module. The channel-failure logic output to the failure indicator is presented on terminal 535 of amplifier and monitor module 510, terminal 536 of amplifier module 511, terminal 537 of amplifier module 512, and terminal 538 of amplifier module 513. Channel-failure logic indications are transmitted to the summing amplifier 514 FIG. 6B from a terminal 540 of amplifier and monitor module 510 to summing amplifier terminal 541, from a terminal 542 of module 511 to summing amplifier terminal 543, from a terminal 544 of module 512 to summing amplifier terminal 545, and from a terminal 546 of module 513 to a summing amplifier terminal 547.

A reset function for the "A" channel is provided by connecting a switch 550 FIG. 6A to a module terminal 551 of the "A channel." Reset functions for the "B," "C," and "D" channels are provided by connecting switches 552, 553, and 554 respectively to terminals 555, 556, and 557 of the appropriate amplifier and monitor modules.

Although only amplifier and monitor module 510 is shown in full schematic form, amplifier modules 511, 512, and 513 are internally identical therewith. An integrated circuit differential analog operational amplifier 560, which may be of the Fairchild μA709 variety, performs the high gain amplifier function. A noninverting input 563 of the operational amplifier 560 is connected to a diode limiter 564 which is comprised of two parallel, reversely connected diodes connected between the input and ground. The noninverting input 563 is also connected to a resistor 565 which is connected to input A terminal 330, a resistor 566 which is connected to the Sample A input 332, and to a resistor 567 which is connected to the feedback input terminal 520. An inverting input 568 of the operational amplifier 560 is connected through a resistor 569 to ground. The open loop frequency characteristics of the operational amplifier 560 are compensated for by a capacitor 570 in series combination with a resistor 571 wherein the combination is connected between compensation terminals 572 and 573 of the operational amplifier. The operational amplifier 560 obtains power from positive and negative supplies not shown in the schematic. An output terminal 574 of the operational amplifier 560 is connected to a drain 575 of an n-channel field effect transistor 576. All future references to field effect transistors in this specification will be abbreviated FET. Capacitor 577 is connected between an operational amplifier compensation terminal 578 and a source 579 of the FET 576.

A capacitor 580 is connected between the source 579 of the transistor 476 and the junction between a resistor 581 and a resistor 582. The other end of the resistor 581 is connected to a positive power supply terminal 585 and the other end of resistor 582 is connected to a base 586 of a PNP transistor 587. The base 586 of transistor 587 is also connected through a resistor 590 to the reset terminal 551. An emitter 591 of transistor 587 is connected through a resistor 592 to the power supply terminal 585. A collector 593 of the transistor 587 is connected to the failure indicator output terminals 535 and 540 as well as an anode of a diode 595. A cathode of diode 595 is connected to a junction between a resistor 600 and a resistor 601. The other end of resistor 600 is connected to a gate of FET 576 while the other end of resistor 601 is connected to a negative power supply terminal 603. A capacitor 605 is connected in shunt across resistor 601.

A schematic for the summing amplifier is shown within the dash lines enclosing module 514 in FIG. 6B. An emitter 611 of an NPN transistor 610 is connected through a resistor 612 to amplifier and monitor module terminal 525, through a resistor 613 to module terminal 527, through a resistor 614, to module terminal 529, and also through a resistor 615 to module terminal 531. A diode 616 is connected between the emitter 611 of transistor 610 and ground, with the cathode of diode 616 being connected to ground. A resistor 620 is connected between the emitter 611 of transistor 610 and a negative power supply terminal 622 which may be the same as terminal 603. A resistor 623 and a capacitor 624 are connected in series between the emitter 611 of transistor 610 and a collector 625 of a PNP transistor 626. A collector 627 of transistor 610 is connected through a resistor 628 to a base 629 of transistor 626. An emitter 630 of transistor 626 is connected to the positive supply 585. The supply 585 is also connected through a resistor 640 to input terminal 525, through a resistor 641 to input terminal 527, through a resistor 642 to input terminal 529, and through a resistor 643 to input terminal 531.

The collector 625 of transistor 626 is connected through a resistor 650 to a gate 651 of an n-channel FET 652 and to a collector 653 of an NPN transistor 654. A capacitor 660 is connected between the collector 653 of transistor 654 and ground. An emitter 661 of transistor 654 is connected to the negative voltage supply 603 and through a resistor 662 to a base 663 of transistor 654. The drain terminal 665 of FET 652 is directly connected to the collector 625 of transistor 626 and the source terminal 666 is connected to ground. The base 663 of transistor 654 is connected through a resistor 670 to terminal 541, through a resistor 671 to terminal 543, through a resistor 672 to a terminal 545, and through a resistor 673 to a terminal 547.

OPERATION

Figure 7:
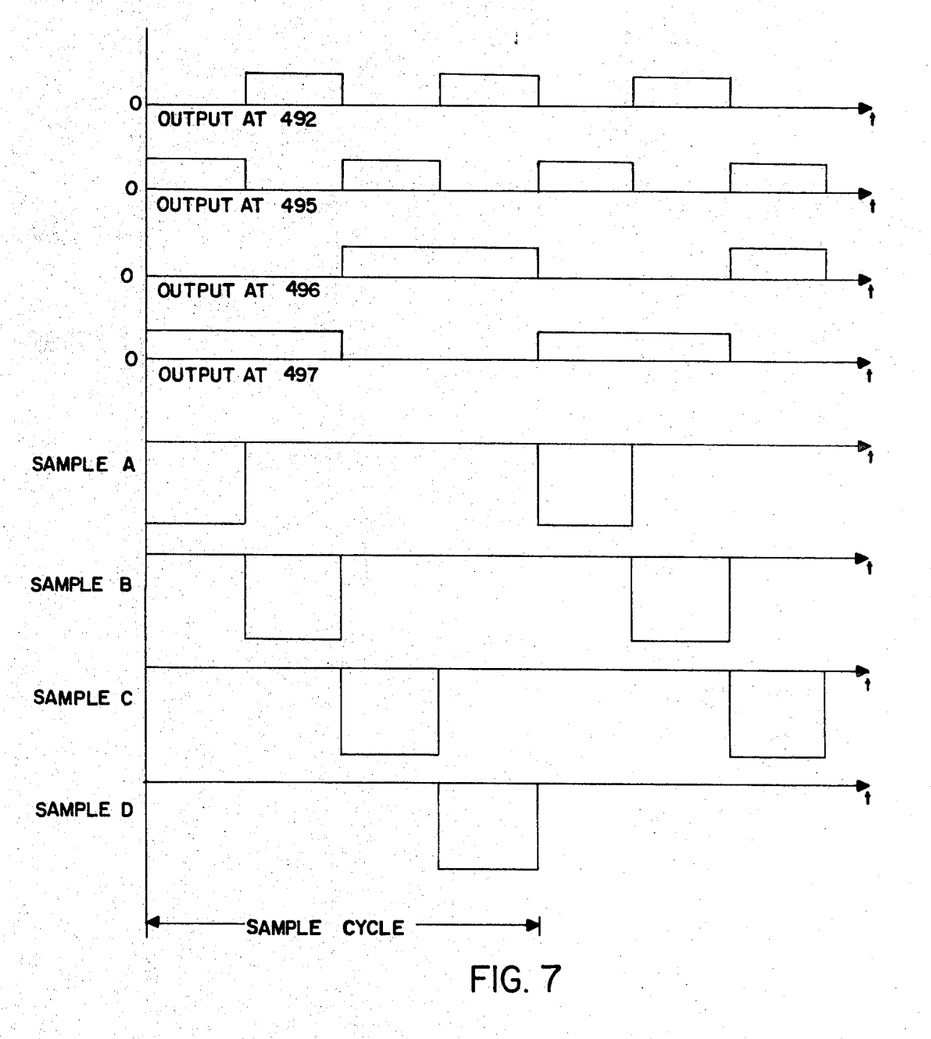
FIG. 7 is a plot of the outputs of the sample signal generator of FIG. 5 showing the time relationship of the four output sample signals.

Before attempting a detailed discussion of the operation of the sampled middle select circuit, an explanation of the operation of the sampling signal generator of FIG. 5 is necessary. In FIG. 5 the clock signal used to drive the flip-flop 491 is derived from the power supply voltage 505. The A.C. voltage turns transistor 500 ON during the positive half cycle and OFF during the negative half cycle thus providing a clock signal having a repetition rate equal to the frequency of the A.C. voltage at terminal 505 at the clock input terminal 498 of flip-flop 491. The output at the flip-flop terminal 492 is a pulse train of positive pulses having a period twice that of the input clock signal. The output appearing at the flip-flop terminal 495 is the inverse of the signal appearing at terminal 492. The signal output from terminal 492 is connected to the clock input 493 of the second flip-flop 494 and the resulting output at 496 has a period which is two times as long as the period of the output signals from the flip-flop 491. The output terminal 497 of the flip-flop 494 has a waveform which is the inverse of the waveform appearing at terminal 496. The phase relationship of the four flip-flop outputs 492, 495, 496, and 497 is shown in FIG. 7.

The transistors 454, 455, 456 and 457 shown in FIG. 5 are configured to act as AND gates producing a negative 12 volt output only when a zero voltage signal is present across both resistors connected to the emitter of the transistor. Thus transistor 454 will produce a voltage approximately equal to the voltage of negative power supply 464 at the output 450 when the output of terminal 492 of flip-flop 491 and the output of terminal 496 of flip-flop 494 both have zero voltage. Similarly, transistor 455 produces a negative signal at terminal 451 when flip-flop 491 produces a zero voltage output at terminal 495 and flip-flop 494 produces a zero voltage output at terminal 496; transistor 456 produces an output at terminal 452 when the flip-flop 491 produces a zero voltage output, an output at terminal 492 and the flip-flop 494 produces a zero voltage output at terminal 497; and transistor 457 produces an output at terminal 453 when the flip-flop 491 produces a zero voltage output at terminal 495 and the flip-flop 494 produces a zero voltage output at terminal 497. FIG. 7 indicates that the A, B, C and D outputs present respectively at terminals 450, 451, 452 and 453 are generated sequentially, no two outputs being coincident. The time required for generation of a single series of A, B, C and D pulses is defined as the sample cycle and it is equal to four times the period of the excitation sine wave or 10 milliseconds for 400 Hz. excitation.

The development of the theory of operation of this invention is most easily accomplished by considering the operation of the two channel configuration shown in FIG. 1 without sampling inputs being applied at 32 and 36. The two channel configuration as illustrated, is also the configuration of the four channel preferred embodiment of the system after the failure of two channels. The specific values of the signal magnitudes as used herein are not determinative of the invention, but are chosen for purposes of illustration. The two high gain amplifiers 12 and 14 are connected so that they are receiving a single identical feedback signal from the output of summing amplifier 10 through resistors 21 and 23. This feedback signal is thus the amplified sum of the output of amplifier 12 passed through resistor 11, the output of amplifier 14 passed through resistor 13, and the voltage of voltage source 38 passed through resistor 39 and tends to balance the input to amplifier 10. Assume for the purposes of illustration that the magnitude of voltage source 38 is equal to +3 volts, the gain of the summing amplifier 10 is equal to −20. It is well know that since amplifiers 12 and 14 have nearly infinite gain, the output of both amplifiers will be saturated unless the sum of the input signals and feedback signals to each amplifier 12, 14 is nearly zero. In the configuration shown in FIG. 1, even a small difference between the input applied at input A terminal 30 and the input applied to input B terminal 34 will result in only one of the amplifiers operating in its active or unsaturated mode as the feedback signal cannot equal both input signals if they are different, thus amplifier 12 or 14 will have an unbalanced input. The amplifier with the unbalanced input and because of its high gain will be saturated. Thus if input A be negative and input B be negative but input A the more negative, the feedback will tend to balance amplifier B. If the maximum output swing of the summing amplifier 10 is plus or minus 10 volts and its gain is −20, the sum of the outputs of amplifiers 12 and 14 and of voltage source 38 must be between plus 0.5 volt and −0.5 volt, for normal operation of the summing amplifier. If the voltage source 38 is equal to +3 volts, the sum of the outputs of amplifiers 12 and 14 must therefore lie between −2.5 volts and −3.5 volts in order to wash out the offset. Since from above one of the high gain amplifiers must be saturated, and since the sum of the amplifier outputs has been found to be negative, the output of the saturated amplifier will be negative and equal to about the negative supply voltage for amplifiers 12 and 14 or −10 volts for the purposes of illustration. When one high gain amplifier has an output equal to −10 volts and the voltage of supply 38 is +3 volts, the signal output range of the active or non-saturated amplifier 12 or 14 to summing amplifier 10 will lie between +6.5 volts and +7.5 volts. Consideration of the operation of the high gain amplifier combination as indicated in FIG. 1 leads to the observation that the amplifier having the saturated output voltage is the one receiving the most negative of the two input signals, input A and input B FIG. 1. Thus, for two channel operation, as to input A and input B the system is responsive to so as to transmit the more positive input signal while rejecting or not transmitting the more negative input signal.

The positive offset signal from voltage source 38 caused the more positive input signal to be selected when applied to the summing amplifier 10 in combination with the outputs of amplifiers 12 and 14. If an offset signal were not used, the system would select the input signal nearest to zero if both inputs were of the same polarity. If the input signals were of opposite polarity, both amplifiers would be saturated and a system dead spot would result. It should be noted that the offset signal from voltage source 38 does not affect the normal output since it is inside a very high gain loop and is therefore not affecting the output offset.

The summing amplifier 10 is shown with a gain of −20. This is a convenient gain for discussion purposes and any higher gain would be equally suitable. It is important for this sampled middle selector application, that the high gain amplifiers have a considerable excess of command authority and this excess authority is provided by the gain of the summing amplifier. The need for this excess authority will become apparent in later paragraphs.

Figure 8:
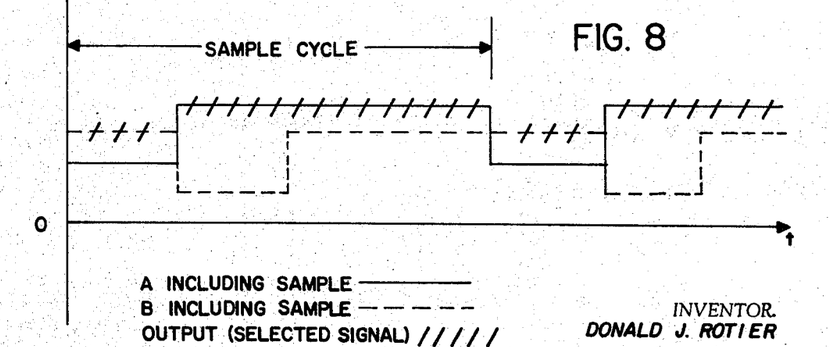
FIG. 8 shows the signal selection process in the two channel sampled middle select circuit.

The above discussion was for the two channel operation of the system without sampling inputs being applied at terminals 32 and 36 of FIG. 1. When the negative sample A signal is applied to terminal 32 or the negative sample B signal is applied to terminal 36, the input signals to amplifiers 12 and 14 may be considered as the sum of the channel input and the instantaneous sample signal. The signal selection process is illustrated in FIG. 8. In this example, the two signal channel inputs 30 and 34 of FIG. 1 are both positive and the A signal is slightly more positive than the B signal. When the negative sample A signal from FIG. 7 is applied to the sample A input terminal 32 of FIG. 1, the A signal input is decreased by the sampling signal and is instantaneously less than the B input so that the signal actually transmitted during the time that the sample A pulse is applied, is the B signal. When the negative sample B pulse is applied, the B input is diminished by the magnitude of the sample signal and the A signal, being the more positive of the two signals, is transmitted from the summing amplifier 10 until another negative sample A pulse is received. It may be seen from FIG. 8 that the signal actually transmitted over the entire sample cycle is the B signal for ¼ of the cycle and the A signal for ¾ of the cycle since input A is greater than input B.

Figure 9A:
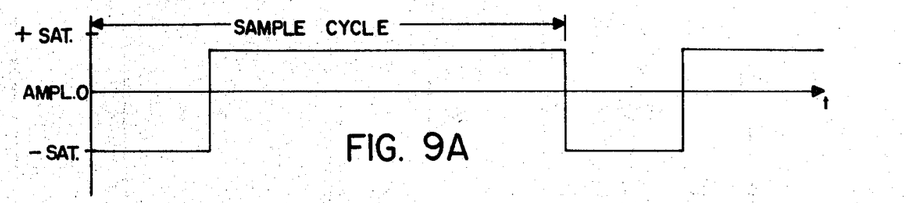
FIGS. 9A and 9B are plots of the output waveforms from the two amplifiers in the two channel sampled middle select circuit.
Figure 9B:
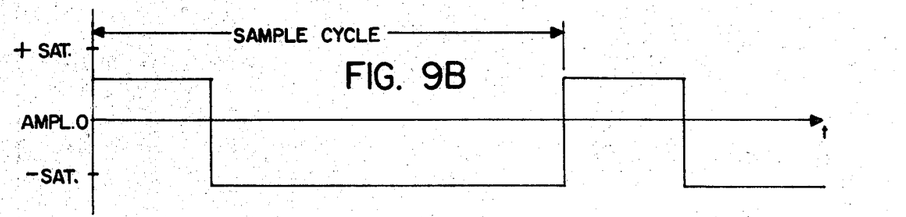

The individual output of the A channel amplifier 12 is shown in FIG. 9a and the output of B channel amplifier 14 is shown in FIG. 9b for the same time interval depicted in FIG 8. The A signal and the B signal have magnitudes whose difference is less than the magnitude than the sample signal and the A signal is more positive than the B signal. The waveforms shown are approximately 17 volts peak to peak if a 10 volt saturation voltage is assurred. The summation of the waveform from amplifier 12, the waveform from amplifier 14, and the offset from voltage source 38 produces an output from the summing amplifiers 10 as indicated in FIG. 8.

If a failure occurs in the system or the monitor, the signals in the two channels will differ by more than the peak sample voltage. If the A signal is assumed to be the more positive signal, the output after a failure would be equal to the A signal for the time interval when the A sample is not applied and equal to the A signal minus the sample signal when the A sample signal is applied. The average signal over the negative entire sample cycle would therefore be equal to the A signal minus ¼ of the amplitude of the peak sample signal. The average value of the output signal after failure would thus be less positive than before failure.

Figure 10:
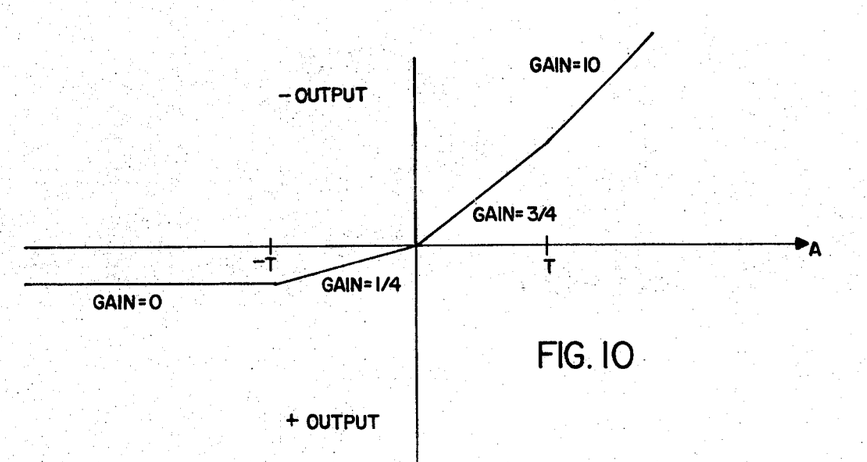
FIG. 10 is a graph showing the relationship between the sampled middle select output and input A in a two channel system when input B is equal to zero.

FIG. 10 is an input-output gain graph illustrating the relation of the two channel output 20 of FIG. 1 to the A channel input for the special case where the B channel input is equal to zero. The value of T, the trip level, is determined by the sample signal amplitude. In actual operation of the preferred embodiment, the gain characteristics shown in FIG. 10 and described above will not be noticeable because a rapid blanking circuit is included as a part of the final system to suppress output errors. The blanking circuit clamps the output of the summing amplifier 10 to a zero level within 20 milliseconds of the detection of a failure. The system disconnect process is purposely set to operate much slower than the sampling interval to minimize nuisance trip outs which would otherwise be caused by power supply transients and other sources of spurious signal. The features of the disconnect circuitry will be discussed in a later description of the actual circuitry.

FIG. 2 shows the system in a configuration where three channels are functioning. The offset signal introduced by the voltage source 238 is now arbitrarily assumed to be —1 volt for discussion purposes. By the same sort of reasoning used in the description of the two channel system of FIG. 1, the operation of the three channel system is described with no sample signals being applied. Since the gain of the amplifiers 212, 214 and 216 is extremely high and all amplifiers receive the same feedback signal from the output 220 of the summing amplifier 210, it is a reasonable assumption that only one amplifier may be operating in the active or unsaturated state.

FIG. 2 operates in a manner similar to that described for FIG. 1 but operates such that the median or intermediate input signal is represented at the output. An explanation similar to that given in the operation for FIG. 1 will be provided although in a simplified form since with a little thought, the operation is somewhat obvious. If signals A, B, and C are all positive, ignoring the sample signals for the moment, each of the amplifiers A, B, and C will become saturated. Now, if it be assumed that signal A is the most positive and signal C is the least positive, the output potential at junction 220 will change in the negative direction due to the inversion of signal amplitude between terminals 222, 224, 226, and output 220 until amplifier C initially has zero output and then subsequently produces a saturated negative output. At this point the signals from positive saturated amplifier A and negative saturated amplifier C cancel each other, and only a small decrease in amplitude of the feedback signal is necessary for amplifier B to provide an output which matches the current through resistor 239 obtained from the negative terminal 238. Further step-by-step explanations could be given for other situations such as having all negative input signals or having part of the input signals negative but this is believed unnecessary. The criteria for normal operation of the summing amplifier 210 having a —20 gain and with a —1 volt bias from terminal 238 applied requires the sum of the outputs of the three amplifiers 212, 214 and 216 to lie between 0.5 and 1.5 volts. In order for the sum of the three amplifier outputs to lie between 0.5 and 1.5 volts, the two saturated amplifiers A and C must have outputs saturated and of opposite polarity. Since the outputs of the two saturated amplifiers sum to zero volts if the saturation characteristics of the amplifiers are similar, the output of the active amplifier B must lie between 0.5 and 1.5 volts. It is also apparent that the saturated amplifiers are those receiving the most positive and the most negative of the channel inputs on 230, 234, 240 and the system is therefore responding only to the middle or median of the three inputs. It is realized at this time that the —1 volt offset signal from voltage source 238 has no function in the explanation of a three channel circuit but its inclusion is related to the detailed circuit mechanization of the preferred embodiment which will be discussed later.

Figure 11:
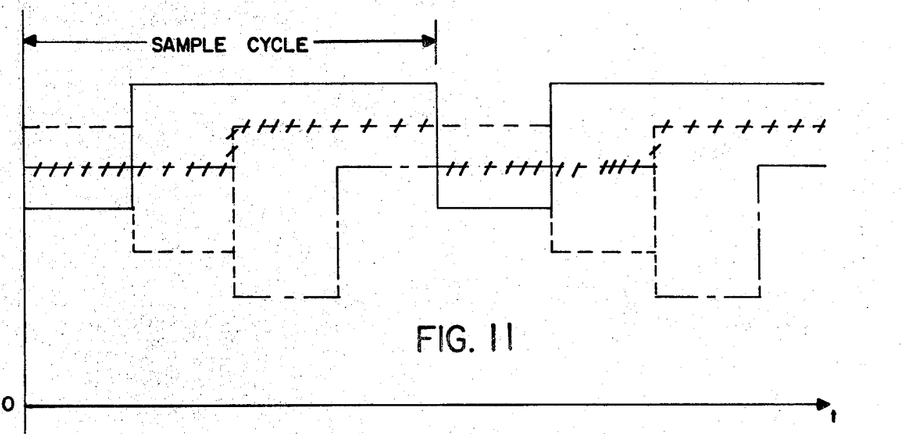
FIG. 11 is a plot showing the signal selection process in the three channel sampled middle select circuit.

The three channel configuration of the sampled middle select system is operated as a sampled system by connecting the outputs of the sample signal generator of FIG. 5 to the sample pulse inputs 232, 236 and 242 of the three channel network of FIG. 2. As in the two channel system, the sample input pulse is effectively added to the normal channel inputs. FIG. 11 shows the signal selection process for the three channel system with a sampling signal applied. The A channel signal is chosen for the illustration as the most positive signal, the B channel signal is the median or middle value signal, and the C channel signal is the least positive signal. Since a three channel system selects the instantaneous intermediate signal it can be seen in FIG. 6 that during the interval when A sample signal is applied that the median signal will be the C signal. During the interval that the B sample signal is applied, the median signal is also the C signal. During the interval that the C sample signal is applied and also during the interval that no sample signal is applied, the B signal is the median signal. Thus it can be seen that the output for the situation illustrated in FIG. 11 will be equal to the B channel signal for one half of the sample cycle and the C channel signal for the other half of the sample cycle; or more generally that the output of the three channel sampled system, when all signals are in tolerance, is equal to the average of the two most negative signals.

The relationships developed in the preceding paragraph are true only as long as all three signals differ by not more than the peak magnitude of the sample signal. In the example of FIG. 11, if the A signal were to increase in the positive direction, a change in output would occur after the A signal differs from the C signal by more than the magnitude of the sample signal. The average output signal over a single sample cycle may be shown to be equal to ¼ of the difference between the A signal and the sample signal plus ½ of the B channel signal plus ¼ of the C channel signal. If A channel fails causing a large positive signal, the condition is detected when the channel A signal minus the sample signal is more positive than the B channel signal. The average output after this failure is equal to ¾ of the B channel signal plus ¼ of the C channel signal.

Further consideration of FIG. 11 will readily define the output as A channel signal migrates in the negative direction. Three distinct regions exist for this case also. For the first region where the A channel signal is less than the B channel signal but greater than the C channel signal, the average output is equal to ½ of the A channel signal plus ½ of the C channel signal. A second region is entered when the A channel signal is less than the B channel signal and the difference between the two signals is greater than the magnitude of the sampling signal, the of the A channel signal plus ½ of the C channel signal plus ¼ of the difference between the B channel signal and the sampling signal. A third region is defined for the condition when the A channel signal is less than the B and the C channel signals and the difference between the A channel and the B channel or the C channel signals exceed the amplitude of the sample signal, the output of the system may be expressed as ¼ of the difference between the B channel signal and the sample signal plus ¼ the difference between the C channel signal and the sampling signal plus ½ of the C channel signal.

As will be later described, the A channel signal will be disconnected when the conditions described in the third case of the previous paragraph are reached. When the A channel has been disconnected the system reverts to a two channel configuration as in FIG. 1 and the average output of the system is equal to ¾ of the B channel signal plus ¼ of the C channel signal.

The disconnect transient signal at the output of the system following a failure in one of the signal channels can be predicted by calculating the difference between the output voltage of the two channel system as derived in the previous paragraph and the output of the system before the failed channel is disconnected. When a signal fails by increasing in the positive direction, the effect of the failure is rejected at the output. The output of the system is unchanged by disconnecting the failed signal channel because the most positive signal does not contribute to the output so that no transient output occurs following a failure in the positive direction. The transient that occurs when a negative signal is disconnected will be found to be ½ of the difference between the remaining B and C channel signals plus ½ of the magnitude of the sampling signal. Since the B and C channel signals have not failed, the difference between the two signals must be less than the magnitude of the sampling signal. Thus the maximum transient possible at the output of the system when one of the channels fails in a negative direction is limited to the tolerance allowed between signals and is a transient in the negative direction. If the input signals to the two remaining non-failed channels are equal, the maximum disconnect transient is equal to ½ of the tolerance allowed between the signals.

Figure 12:
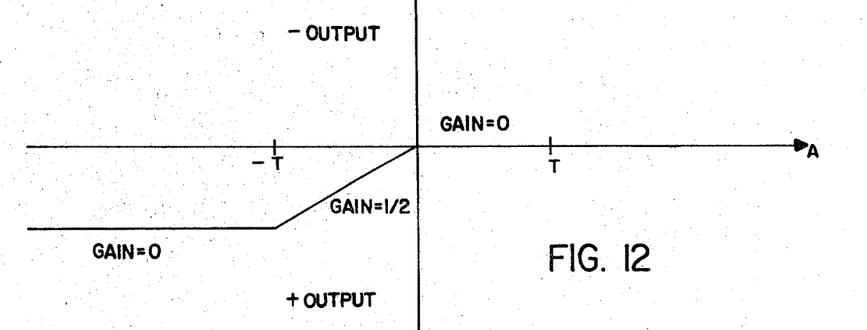
FIG. 12 is a graph showing the relationship between the sampled middle select output and input A in a three channel system when input B and C are equal to zero.

The graph shown in FIG. 12 indicates the gain relationship between the A channel input signal and the system output signal if the B and C channel signals are held equal to zero.

The four channel configuration of the system is shown in FIG. 3, and is similar to the three channel configuration with the exception of the addition of the amplifier 318 and the change in the bias voltage 338 from —1 volt to —5 volts for the preferred embodiment. By the type of reasoning developed in the previous paragraphs it can be seen that only one high gain amplifier 312, 314, 316 or 318 in a four channel system can be in the active condition. Assume that positive signals are applied to terminals 330, 334, 340, and 344. Since a —5 volt bias voltage is used for voltage source 338, it can be seen that the sum of the high gain amplifier outputs is constrained by the —5 volt bias and amplifier 310 to lie between +4.5 and +5.5 volts. Considering the constraints applied to the summing amplifier 310 which are the same as those for amplifier 10 described it is seen that two of the three saturated amplifiers will be saturated at the positive saturation voltage of +10 volts while the third amplifier is saturated at —10 volts. The output of the active amplifier in order to satisfy the above constraints on summing amplifier 310 for example must lie between —4.5 volts and —5.5 volts because of the —5 volt bias and +volts of one positive saturated amplifier. It can further be seen that the three saturated amplifiers are those receiving the two most positive input signals and the least positive input signal. Therefore the system responds to only the least positive of the two middle input signals. A similar result will occur as to the number and direction of saturation of the inactive amplifiers for negative inputs.

Figure 13:
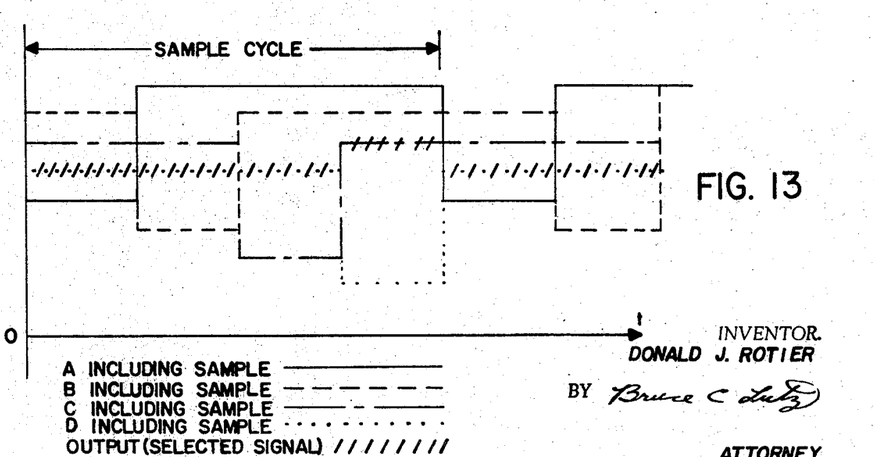
FIG. 13 is a plot showing the signal selection process in the four channel sampled middle select system.

When the four sampling signals are applied from the circuit in FIG. 5, a sampling process as illustrated in FIG. 13 results. It is once again emphasized that the four channel system selects the least positive of the two middle signals. From the case illustrated in FIG. 13, all signals are mutually within the tolerance defined by the amplitude of the sampling signal and it can be seen that the output is a function of the two most negative signals and its average value is equal to ¼ of the C channel signal plus ¾ of the D channel signal.

If the system has the signal magnitude relationship shown in FIG. 13, and A is allowed to migrate in the negative direction, the following relationships will exist. When C is greater than A which is greater than D, the average output would be equal to ¼ of the C channel signal plus ¾ of the D channel signal. When the A channel signal becomes the most negative signal, the A and B signals change roles so that the output is given by ¾ of the A channel signal plus ¼ of the D channel signal. When the A channel signal fails in the negative direction and has not been disconnected, the average signal output of the system is equal to ¼ of the B channel signal plus ¼ of the C channel signal plus ½ of the difference between the D channel signal and ¾ of the sample signal. After the failed A channel is disconnected, the system reverts to three channel operation as in FIG. 2 where the output is the average of the two most negative signals or equal to ½ of the C channel signal plus ½ of the D channel signal.

The disconnect transient following a negative failure of the A channel signal is obtained by deriving the system output before and after the A channel is disconnected and computing the difference. The transient is equal to ¼ of the difference between the C and B channel signals plus 3.4 of the sample signal. Since the B channel signal was defined as being more positive than the C channel signal, the largest transient occurs when the difference between the C channel signal and the B channel signal is zero. The transient is a negative disturbance equal to ¾ of the allowable channel tolerance. There will be no disconnect transient after a failure of the A channel in the positive direction.

Figure 14:
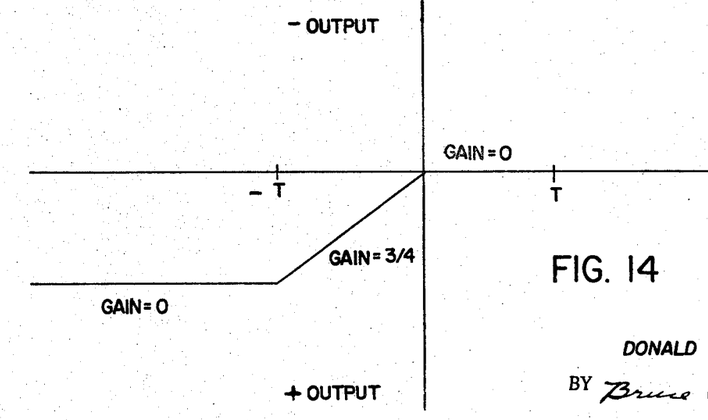
FIG. 14 is a graph showing the relationship between the sampled middle select output and input A in a four channel system when inputs B, C, and D are equal to zero.

FIG. 14 is a graph showing the system output as the A channel signal varies while the B, C, and D channel signals are held at zero.

The two and four channel configurations both require an offset voltage in the circuit to steer the signal selection process when the channel inputs have opposite polarities. For the two channel system a positive offset was used to cause the system to select the most positive of the two inputs. When negative pulses were chosen to be used as sampling signals, any null shift due to the regular pulses is prevented. If a positive offset were retained in the four channel configuration, the most negative channel would be immediately disconnected because its amplifier would remain in negative saturation throughout the sample cycle. Thus a negative offset permits the system to operate properly in the four channel mode.

The shift in the offset polarities as the number of enabled channels varies is automatic in the preferred embodiment. The mechanism for accomplishing the shift is illustrated in the four channel block diagram of FIG. 4. When all the switches 400, 401, 402 and 403 are closed, the amplifiers prevent the positive offset signals from entering the summing amplifier. The offset into the summing amplifier is then equivalent to a —5 volt signal. When one switch opens due to a first failure, the positive current reduces the equivalent offset to —1 volt. After a second failure, two switches have opened and the +3 volt offset desired for two channel operation is established. If the system is operated in a single channel mode, the offset is equivalent to +7 volts. The only operating criteria for this last value is that a single amplifier must have sufficient output range to overcome the offset. It is obvious that one skilled in the art might choose offset voltages different than those shown here. Specific values are shown here as they are used in the preferred embodiment.

The detection of channel failures in the system is accomplished by the detection of the AC component which normally exists at the output of the high gain amplifiers 312, 314, 316 and 318 in FIG. 4. The AC component on the downstream side of the amplifier output switch is rectified and used to hold the switch closed. When a failure occurs, the AC component disappears and the switch is opened. The arrangement is self latching. The time required for the switch to open following a failure is controlled by the filter time constant of the output of the rectifier 410.

A failure is detected in the four channel system when one of the channel inputs differs by more than the peak sample signal from the most negative of the two middle channel inputs. The system then disconnects the failed channel and reverts to three channel operation.

A failure is detected for a three channel system when a channel input differs by more than the peak sample signal from the middle amplitude channel input. The system then disconnects the failed channel and reverts to two channel operation.

For the two channel system a failure is detected if a channel input differs by more than the peak sample signal amplitude. The system output is then disconnected.

FIG. 6A and FIG. 6B comprise the schematic of the complete four channel sampled middle select system shown in block diagram form in FIG. 4. The A channel input signal is passed through resistor 565 and summed with the feedback signal which passes through resistor 567. Since resistors 565 and 567 are both equal in the preferred embodiment, the closed loop gain of the amplifier 560, operating in the active region, will be unity. Since the sample signal is summed with the input signal through a resistor 566, the sample signal generated by the circuitry of FIG. 5 will establish an allowable channel tolerance equal to the ratio of resistor 565 to resistor 556 times the sample signal magnitude of about 2 volts in the preferred embodiment. It is obvious that the ratio of resistor 565 to resistor 566 may be adjusted to achieve various channel tolerance limits.

The composite signal representing the summation of the A input signal, the A sample signal, and the common feedback signal is passed through the diode limiter 564 to the non-inverting input of the operational amplifier 560. The output of amplifier 560 at output terminal 574 is passed through the FET switch 576. The FET switch 576 is normally turned on when the A channel is operating correctly and producing a large AC voltage at its output. The AC voltage passed through FET switch 576 is conducted through capacitor 580, alternately turning transistor 578 on and off and thus producing an unfiltered DC voltage at the collector 593. The voltage from 593 is passed through diode 595 and filtered by the combination of resistor 601 and the 10 mfd. capacitor 602. The filtered DC passes through resistor 600 providing a forward bias for FET switch 576 forcing it to remain in conduction as long as the output 574 of operational amplifier 560 maintains a large AC component. If the signal output of amplifier 560 fails to either zero or to a high voltage, the forward bias for the FET switch 576 is removed and the switch is opened. The FET switch 576 is latched in the opened condition upon failure of the signal and must be reset by a momentary closure of the reset switch 550 which forces FET switch 576 into conduction and allows the AC voltage at the output of the amplifier to be applied to the capacitor 580 and the monitor circuit. Each module 511, 512, and 513 also contains such a monitor circuit which detects the AC normally present on the output of the high gain amplifier and provides a latching disconnect function when a failure in a condition sensor, the summing circuitry or the operational amplifier causes the output signal of the amplifier to be equal to zero volts or a hard over DC signal.

The unfiltered DC signal from the collector 593 of transistor 587 is passed through terminal 535 to an external high reliability failure indicator not shown, which senses the loss of the ripple component of the signal. Individual failure indications are provided at module terminals 535, 536, 537 and 538 which monitor respectively the A, B, C and D channels of the system. The unfiltered signal is also conducted to the summing amplifier module 514 and is summed with the similar signals from the other three channels. The four channel monitor signals are summed through resistors 670, 671, 672, and 673 and passed to the base 663 of transistor 654 of the output blanking circuit comprising transistor 654 and FET 652. When the system is operating normally, the monitoring signals forward bias transistor 653 turning on transistor 654 which in turn back-biases the FET switch 652 which is connected in shunt with the output 320 of the system. Thus when the monitor signals indicate that the system is functioning properly, FET switch 652 is in the open condition and the signal output from the summing amplifier is conducted normally to the next elements in the system. When the system operates in a two channel mode, the FET switch 652 will be turned on and clamp the system output to zero after a third failure occurs. The blanking action occurs within 20 milliseconds after the third failure, and the output blanking is nonlatching. If the channel signals return within tolerance before the monitor switches in the individual channel monitors actually disconnect, the blanking action will cease and the system will return to normal operation. This nonlatching feature minimizes transient disturbances without making the system prone to nuisance disengagements.

The signal outputs of the four individual channel modules are connected to summing amplifier terminals 525, 527, 529 and 531 which in turn are connected to identical voltage dividers. When the system is in normal operation the series switch 576 of module 510 is closed as are the shunt switches of the other modules. Thus terminals 525, 527, 529 and 531 may be considered to be connected to low impedance signal sources such as amplifier 560. The low impedances at the terminals 525, 527, 529 and 531 prevent the current from the positive supply 585 from being conducted to the emitter 611 of the input transistor 610. Therefore the bias current for the input transistor 610 is determined by the magnitude of resistor 620 and voltage source 622. The bias voltage for the four channel system is established when all of the channel switches are closed.

When one of the channels has failed and the FET switch 576 has opened, a path is formed between the positive supply 585 and the input transistor 610. Bias current from the positive supply 585 is summed with bias current from the negative supply 622 and a bias current results which may have a current signal which would be equivalent to that obtained from a −1 volt bias. Thus the offset voltage used for explanation of the three channel system is established automatically when one of the channel monitor switches is open. Similarly, failure of the second channel will provide an equivalent offset source of +3 volts due to the opening of a second path for positive bias current established between the input transistor 610 and the positive supply 585.

The summing amplifier is formed by the combination of input transistor 610 and output transistor 626. The input is connected to the emitter of transistor 610 which is essentially connected in a common base configuration. Resistor 631 is used to apply a bias current to diode 632 which is connected between the base 633 and ground. The collector 612 is connected through resistor 628 to the base 629 of output transistor 626. There is a phase inversion between the input and the output of the summing amplifier.

After all channels have been disconnected following a series of failures, single channel operation can be accomplished by selectively closing one of the series disconnect switches by maintaining the appropriate reset switch in the closed position. In this system of operation, the system performs as a normal closed loop system. If the sample signal is still feeding the selected channel, the system will have a small null shift. Since this type of operation is an emergency situation and the null shift that results is only ¼ of the allowed signal tolerances, satisfactory operation results.

In some applications it may be desirable to allow the system to be operated as an unmonitored middle selector. This may be readily accomplished by holding all channels in a reset condition and disabling the sample signals.

Power sources which have not been shown may be necessary to power some of the blocks in the various figures.

Although the embodiments shown have utilized a negative pulse for a sample signal, it is obvious that mechanizations using positive pulses are also a part of this invention. It is also recognized that square wave sampling signals having four relative phases could also be used.

Other alterations and variations will be obvious to those skilled in the art. I do not wish to be limited to this specification or the preferred embodiment as shown in the figures but only by the following claims.

I claim:

1. Apparatus of the class described, comprising in combination:

means for receiving an odd plurality of possible different amplitude input signals;

an odd plurality of high gain signal amplifying means wherein each amplifying means includes an input summing junction connected for receiving a separate one of said plurality of input signals and output means;

a common summing means including input and output means;

means connecting the output means of each of said signal amplifying means into the input means of said common summing means, said high gain signal amplifying means and common summing means providing an inversion of signal amplitude occurring between said input summing junction of said high gain amplifying means and said output means of said common summing means; and means for providing an identical feedback signal from said output means of said common summing means to said input summing junction of each of said odd plurality of high gain amplifying means tending to balance the input of the summing means but causing opposite saturation in two amplifying means to mutually cancel their effects on the summing means whereby the output signal from said summing means is indicative of only the intermediate one of said plurality of input signals when said odd plurality of signals are all different in magnitude.

2. Apparatus of the class described, comprising in combination:

means for receiving and transmitting an even plurality of input signals which may be unlike in amplitude;

an even plurality of high gain signal amplifying means wherein each amplifying means includes an input summing junction connected for receiving a separate one of said input signals and output means;

common signal summing means including input and output means;

means connecting the output means of each of said high gain signal amplifying means into the input means of said common signal summing means, said high gain signal amplifying means and common signal summing means providing an inversion of signal amplitude occurring between said input summing junction of said high gain signal amplifying means and said output means of said common signal summing means;

means for providing a bias signal to the input means of said summing means for summing with the outputs of the high gain amplifying means; and means for providing an identical feedback signal from said output means of said common summing means to the input summing junction of each of said plurality of high gain amplifying means tending to balance the input of the common summing means said feedback signal, when the amplitudes of the plurality of signals are unlike, causes saturation in at least three of the high gain amplifying means of which two provide the same polarity output, whereby the output signal from said common summing means on such differences in amplitudes is indicative of the one of the intermediate pair of said plurality of input signals having a value most nearly approaching the value of the bias signal.

3. Apparatus of the class described in claim 2, and wherein summing junction connected to the amplifying means input means are provided for producing alternating time spaced sample signals, that have a sample cycle, which are added individually to a respective one of the input signals at the input summing junction of said even plurality of high gain amplifying means, causing the total signal at each input to said even plurality of high gain amplifying means to be the largest and the smallest of the even plurality of input signals at least once during a sampling interval or sample cycle provided that each of said plurality of input signals have magnitudes within limits determined by the magnitude of the sample signal to sequentially cycle said amplifying means and transmitting different signals from the common summing means.

4. Apparatus of the class described in claim 3, including monitor means, and wherein each of said even plurality of amplifying means has a switch in series with the output of said even plurality of high gain amplifying means which is controlled by said monitor means and is automatically opened by said monitor means when the AC normally present in the output of a particular amplifying means ceases to be detected by said monitor means.

5. Apparatus of the class described in claim 4 wherein a switch is provided to interrupt the output from said summing means after a predetermined number of said odd plurality of amplifier means have lost their alternating component.

6. Apparatus of the class described, comprising:

a plurality of input signals;

a plurality of high gain, saturable output amplifier means, each one of said plurality of amplifier means having an individual input summing junction and individual output means;

combining means including input means and output means said combining means receiving an input from the output means of said plurality of amplifier means and producing an output varying with the algebraic sum of the outputs of said plurality of amplifier means;

feedback providing means connected to the combining means output and delivering a common feedback signal to the input summing junction of each amplifier of said plurality of amplifier means, the magnitude of the common feedback signal delivered by said feedback means being in accordance with the outputs of said combining means; and cyclic sample signal producing means, providing sequential sample signals at the individual input means of said plurality of amplifier means whereby the total input to the summing junction of each amplifier of said plurality of amplifier means is altered periodically and sequentially relative to the input to another amplifier, causing the output of the amplifier to be switched or altered at least once during a sample interval to a large value to thereby transmit through the feedback means different input signals.

7. Apparatus of the class described in claim 6 wherein said combining means includes offset or signal biasing producing means so that the output of said combining means is equal to the algebraic sum of the outputs of said high gain amplifier means and the offset introduced by the offset producing means.

8. Apparatus of the class described in claim 7 wherein each high gain amplifier of said plurality of amplifier means includes a disconnect switch for making the high gain amplifier means ineffective on the feedback means and a monitor means sensing the AC output of the amplifier means and normally maintaining the amplifier means effective on the feedback means.

9. Apparatus of the class described in claim 8 wherein the combining means and feedback providing means includes monitor switch means controlled by the plurality of amplifier means for disconnecting the output of said combining and feedback means after a predetermined number of amplifier means have been disconnected.

10. Apparatus of the class described, comprising:

means for supplying a plurality of input signals that individually may define a maximum, a minimum, or an intermediate state;

first electrical means having a number of sections equal to the number of signals receiving said plurality of input signals and producing an output which is equal to a signal selected from said plurality of input signals whose magnitude is intermediate to the magnitudes of the most positive and the least positive input signals; and sampling signal means for providing a plurality of like magnitude alternating sampling signals sequentially which separately are added to individual of said plurality of input signals applied to a section of the first electrical means such that the resulting output of said first electrical means is sequentially indicative of various ones of said plurality of input signals.

11. Apparatus of the class described, comprising in combination:
  means for receiving and transmitting an even plurality of input signals which may be unlike in magnitude;
  an even plurality of high gain signal amplifying means wherein each amplifying means includes an input summing junction connected for receiving a separate one of said input signals and output means;
  common signal summing means including input and output means;
  means connecting the output means of each of said high gain signal amplifying means into the input means of said common signal summing means, said high gain signal amplifying means and common signal summing means providing an inversion of signal amplitude occurring between said input summing junction of said high gain signal amplifying means and said output means of said common signal summing means;
  means for providing a positive bias signal to the input means of said summing means for summing with the outputs of the high gain amplifying means; and
  means for providing an identical feedback signal from said output means of said common summing means to the input summing junction of each of said plurality of high gain amplifying means tending to balance the input of the common summing means, said feedback signal, when the magnitude of the even plurality of signals are unlike causing saturation of a high gain amplifying means, said bias signal causing the output of the common signal summing means to substantially correspond with the more positive of the even numbered input signals.

References Cited

UNITED STATES PATENTS

| | | | |
|---|---|---|---|
| 3,146,401 | 8/1964 | Davis | 328—147 |
| 3,204,118 | 8/1965 | Rotier | 307—229 |
| 3,252,008 | 5/1966 | Van Daveer | 307—235 |
| 3,274,509 | 9/1966 | Brown | 330—30 |
| 3,413,492 | 11/1968 | Schneider | 328—151 |
| 3,420,993 | 1/1969 | Chamberlain et al. | 328—147 |

DONALD D. FORRER, Primary Examiner

H. A. DIXON, Assistant Examiner

U.S. Cl. X.R.

307—229, 235; 328—117, 151

UNITED STATES PATENT OFFICE
CERTIFICATE OF CORRECTION

Patent No. 3,551,824        Dated December 29, 1970

Inventor(s) Donald J. Rotier

It is certified that error appears in the above-identified patent and that said Letters Patent are hereby corrected as shown below:

Claim 3, line 2, delete "summing junction" and substitute --means--;

line 3, delete "means" (second occurrence) and substitute --summing junction--.

Signed and sealed this 5th day of October 1971.

(SEAL)
Attest:

EDWARD M. FLETCHER, JR.
Attesting Officer

ROBERT GOTTSCHALK
Acting Commissioner of Patent